Figure 1:
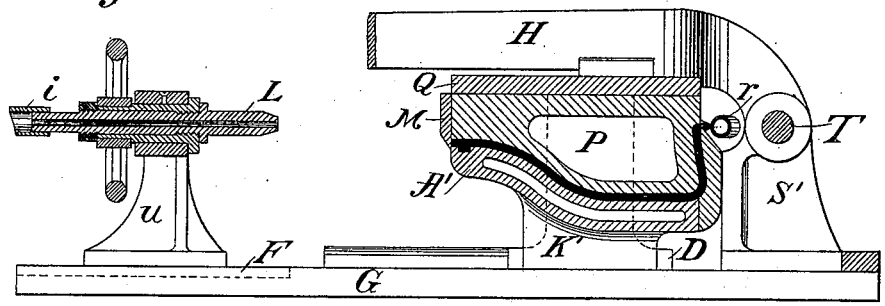

(No Model.) 2 Sheets—Sheet 1.

J. HENNING.
APPARATUS FOR MANUFACTURING BOTTLES, &c.

No. 419,441. Patented Jan. 14, 1890.

Witnesses:—
D. H. Haywood
C. L. Sundgren

Inventor:—
Julius Henning
By attorneys
Brown Griswold (No Model.) 2 Sheets—Sheet 2.

J. HENNING.
APPARATUS FOR MANUFACTURING BOTTLES, &c.

No. 419,441. Patented Jan. 14, 1890.

Witnesses:—
D. N. Haywood
C. E. Sundgren

Inventor:—
Julius Henning
by attorneys
Brown & Griswold

United States Patent Office.

JULIUS HENNING, OF DRESDEN, SAXONY, GERMANY, ASSIGNOR TO HIMSELF AND FRIEDRICH WREDE, OF SAME PLACE.

APPARATUS FOR MANUFACTURING BOTTLES, &c.

SPECIFICATION forming part of Letters Patent No. 419,441, dated January 14, 1890.

Application filed May 18, 1889. Serial No. 311,216. (No model.) Patented in Belgium December 11, 1888, No. 84,243, and in Italy December 31, 1888, XLVIII, 163.

*To all whom it may concern:*

Be it known that I, JULIUS HENNING, of the city of Dresden, in the Kingdom of Saxony, German Empire, have invented certain new and useful Improvements in Apparatus for Manufacturing Bottles, &c., (for which I have obtained a brevet d'invention of the Kingdom of Belgium, No. 84,243, dated December 11, 1888, and a patent of the Kingdom of Italy, No. 163, Vol. XLVIII, dated December 31, 1888,) of which the following is a specification, reference being had to the accompanying drawings.

This invention is especially intended for the manufacture of bottles and other hollow bodies of glass the mouths of which are of less diameter than the bodies by a combined pressing and welding process.

The apparatus which is the subject of the invention will hereinafter be described for manufacturing bottles; but it will be obvious that other forms of hollow glass bodies may be manufactured by the same process and by a similar apparatus.

Before describing the invention I will first briefly explain the process of making a bottle by it.

The bottle is in the first instance made of two corresponding or equal halves (it being supposed that the bottle is divided by a vertical plane through its middle) by means of pressure simultaneously in the two contiguous or connected molds, and after withdrawal of the pressure head or block the two molds are instantaneously closed together, so that the rims of the two halves of the bottle meet and weld, the rim of one or of both halves being kept or brought to welding heat by gas-flames. As soon as the two halves of the bottle are united into a complete bottle, during which operation the superfluous mass of glass protruding at the adjoining parts and at the mouth part is removed, a mandrel which performs also the service of a nozzle is inserted into the mouth of the bottle, such mandrel being employed for the two purposes, first, of smoothing the inner walls of the mouth of the bottle by being rotated, such smoothing being necessary, for such interior length of mouth is intended to receive the cork or other stops, and, second, of introducing a jet of cold air or gas for commencing the cooling down of the bottle. After the mandrel has performed these twofold duties it is withdrawn from the mold, which is now opened in order to remove from it the completed bottle, which may afterward be treated or finished in the usual way of manufacturing bottles. In performing this process it is well to place the two contiguous or connected forms in a vertical position and to arrange the press-head which carries the two counter-forms in such manner that the counter-forms do not enter into the molds vertically, but that they enter therein at an always diminishing angle, whereby a complete filling of the hollow form with the liquid glass previously introduced is insured. The press-head, arranged on a hinge for the purpose of carrying the counter-forms out into the molds with a circular arc movement, permits the manufacture of bottles the bottoms of which are more or less concave. This form of the bottom of bottles cannot be produced if the counter-form is inserted vertically or perpendicularly to the molds. By altering the pivot of the press-head the concavity of the bottle-bottom may be increased or decreased, as will be hereinafter described with reference to the drawings.

Figure 2:
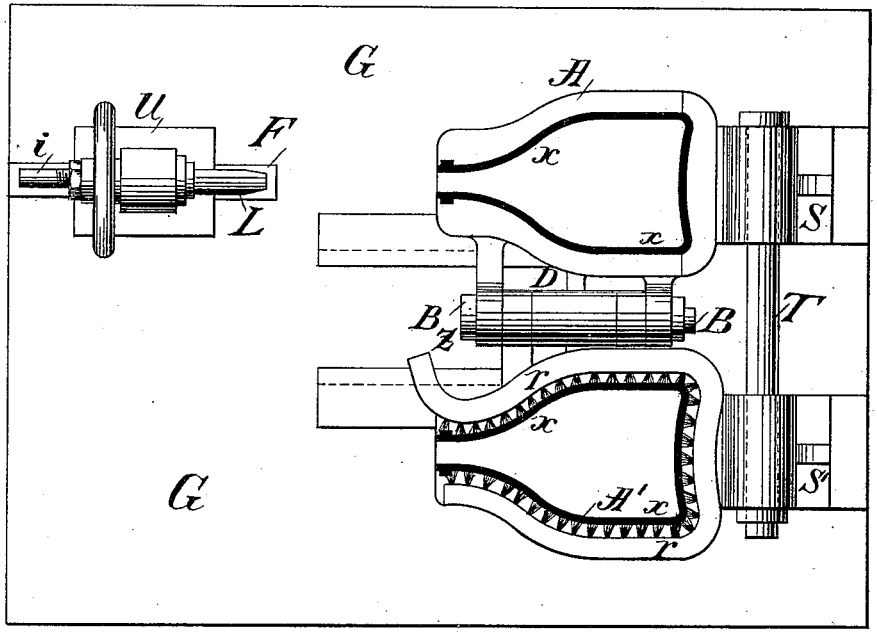
Figure 5:
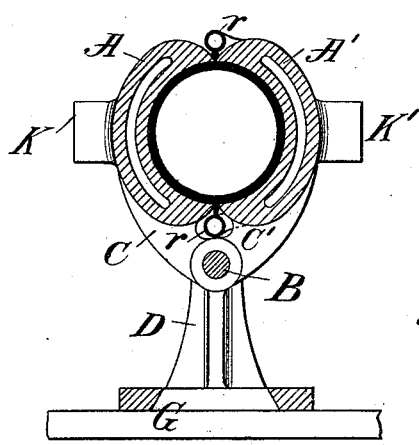
Figure 3:
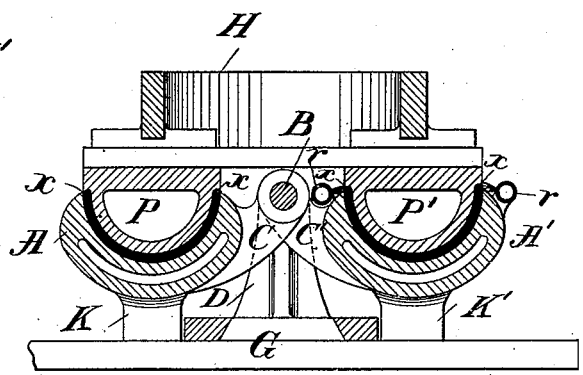
Figure 6:
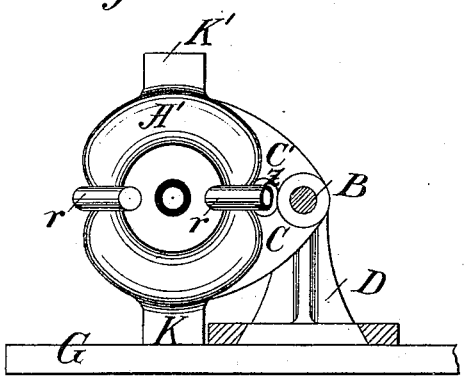
Figure 4:
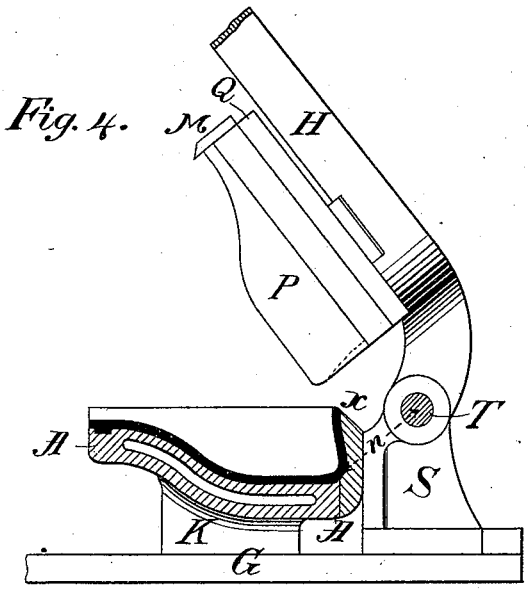

In the figures of the annexed drawings Figures 1 and 3 show, respectively, longitudinal and transverse vertical sections of the apparatus, the counter-forms being shown within the molds. Fig. 2 represents a ground plan of the apparatus, the press-head being omitted. Fig. 4 is a longitudinal section with the press-head elevated and the counter-forms raised out of the molds. Fig. 5 represents a transverse section of the molds closed together with the bottle in them. Fig. 6 is an end view of the closed mold in a position different from Fig. 2.

Similar letters of reference designate corresponding parts in all the figures.

A A' are the two molds, which, by their hinges C C', are fitted around the horizontal bolt B, and may be turned on said bolt, the latter being arranged in the standard D, which is arranged to be shifted on the bed-plate G.

The molds A A' are provided on their back parts with blocks K K', with which they rest during the pressing operation on the bed-plate G. On the latter and behind the molds A A' another bracket S is arranged, to which, by means of the bolt T, the press-head is hinged, this press-head being composed of the plate Q, the counter-forms P P' on the lower surface of said plate, and the lever H. One of the molds is surrounded near its rim by a gas-pipe r, the perforations of which are directed toward said rim, ejecting flames toward the latter.

The molds as well as the counter-forms may be formed with hollow walls, as represented, so as to allow a stream of cold water or air to circulate in them for cooling purposes.

In front of one of the molds a sliding standard U is arranged and movable in the slot F of the bed-plate. This sliding standard carries the mandrel L, which may be turned in the said standard U by means of the hand-wheel. This mandrel is provided with a hole through its entire length, and its front end is formed into a nozzle, so that by a flexible pipe i, drawn over its rear end, cold air or gas may be introduced into the hot bottles through the said mandrel after the latter has been introduced into the mouths of the said bottles for smoothing down any seams therein.

The process of manufacturing the bottle is conducted as follows: While the apparatus is in the position Fig. 4 the liquid vitreous mass is poured into the molds A A', and immediately afterward the press-head, by means of its lever H, is moved downwardly either by motor or manual labor or power. The counter-forms P P' of the press-head have their hinge-pivot T in rear of those portions of the molds and counter-forms which produce the bottom of the bottle, and are so caused to enter at a constantly-decreasing angle into the molds and thereby cause the vitreous liquid mass to fill up the press-space of the mold from top to bottom—that is to say, it will be pressed toward the mouth end of the half-bottle as well as toward the bottom end. By this pressure process two halves of one bottle are formed. The superfluous vitreous liquid may be removed by the rim x x of the counter-forms and by the knives M at the mouth end. By the curved motion of the press-head the counter-forms P P' are so guided or moved that they allow the formation of half a bottom in each mold with suitable concavity. By altering the position of the pivot T either higher or lower the bottom of the bottle may be formed more or less concave, according to the circle described by the radius n, indicated by a dotted line in Fig. 4.

Figs. 1 and 3 show the position of parts during the pressing operation by which equal halves of a bottle are produced.

After the withdrawal or removal of the press-head the molds are drawn forward with their standard D beyond the reach of the press-head, to permit them to be closed together by movement around their bolt B into the position of Fig. 5, and thereafter to be turned on the said bolt to the position of Fig. 6. During all these manipulations or operations with the molds small jets of burning gas may be directed from the gas-pipe r against the joining-line of the two molds, in order that the welding-line of the halves of the bottle may be kept or brought to the degree of fusibility necessary for the perfect welding. The gas-jets issuing from the gas-pipe r may burn permanently or may be ignited by the glowing glass issuing from the line of junction or union of the two molds. As soon as the molds are brought into the position Fig. 6 the mandrel L and its standard, which is in line with the closed molds, are advanced in order to introduce the mandrel into the mouth of the bottle within the molds. By turning this mandrel by means of the hand-wheel provided on it the interior of the mouth is smoothed, so as to present even surfaces to the cork in using the bottle. Simultaneously with the smoothing operation the commencing of the cooling down of the bottle is caused by introducing a jet of air or gas into the bottle through the bore-hole of the mandrel L. After drawing back the standard U, and thereby withdrawing the mandrel from the bottle, the molds A A' are opened, the completed bottle is taken away by the usual manipulation, and the molds, with their standard D, are shifted backward into their initial position.

The press-head may be suspended in chains over pulleys, counterbalanced by weights, or may be counterbalanced by levers loaded with weights.

It is evident that according to this process hollow bottles of glass may be produced of round, oblong, angular, or even irregular cross-section, it being so understood that the molds are to be so arranged that the welding-joints of the two parts meet together. By the process described, bottles or other vitreous articles are produced with walls of perfectly-equal thickness in all parts, which will stand pretty high pressure.

If necessary, the above process may be executed in more than two contiguous or connected molds, it being only necessary to arrange these series of molds in such a manner that in closed position each mold constitutes a cavity corresponding with the bottle or body of glass to be produced. Of course the mold must always be so arranged, whether two or more, that the pressure operation takes place simultaneously in all of them.

What I claim as my invention, and desire to secure by Letters Patent, is—

1. In an apparatus for manufacturing glass bottles or similar articles by a combined pressing and welding process, the combination of two molds A A', capable of being closed one on the other, of a press-head Q H, with forms P P' on its lower surface, and a hollow mandrel L, capable of being revolved, the said molds and mandrel being capable of moving together lengthwise, substantially as herein described.

2. In an apparatus for the purpose above specified, the combination of the hollow forms or molds A A', the counter-forms P P', and a pivot T, connecting the said forms or molds and counter-forms arranged in the rear thereof, substantially as described, whereby the counter-forms are caused to enter the forms or molds A A' at a continuously-decreasing angle, as herein set forth.

3. In an apparatus for the purpose above specified, the combination, with the molds A A' and the press-head Q H and its counter-forms P P', of a gas-pipe $r$, with perforations around the adjoining rims of the two molds A A', substantially as and for the purpose herein set forth.

4. In an apparatus for the purpose specified, the combination, with the molds A A', of the mandrel L, for smoothing the interiors of the necks of the bottles cast in said molds, and at the same time introducing air or gas into the interiors thereof, substantially as herein set forth.

In testimony that I claim the foregoing as my invention I have signed my name in presence of two subscribing witnesses.

JULIUS HENNING.

Witnesses:
WILHELM WIESENHÜTTER,
RICHARD KUNZE.